United States Patent
Vulto et al.

(10) Patent No.: US 9,429,249 B2
(45) Date of Patent: Aug. 30, 2016

(54) FLUID TRIGGERABLE VALVES

(71) Applicant: Universiteit Leiden, Leiden (NL)

(72) Inventors: Paul Vulto, Leiden (NL); Sebastiaan Johannes Trietsch, Leiden (NL); Ender Yildirim, Leiden (NL)

(73) Assignee: Universiteit Leiden, Leiden (NL)

( * ) Notice: Subject to any disclaimer, the term of this patent is extended or adjusted under 35 U.S.C. 154(b) by 0 days.

(21) Appl. No.: 14/465,345

(22) Filed: Aug. 21, 2014

(65) Prior Publication Data
US 2015/0040999 A1    Feb. 12, 2015

(30) Foreign Application Priority Data
Aug. 8, 2013 (NL) .................... 2011285

(51) Int. Cl.
*B01L 99/00* (2010.01)
*F16K 99/00* (2006.01)
*B01L 3/00* (2006.01)

(52) U.S. Cl.
CPC ....... *F16K 99/0026* (2013.01); *B01L 3/502738* (2013.01); *B01L 3/502746* (2013.01); *B01L 2400/0406* (2013.01); *B01L 2400/0688* (2013.01); *F16K 2099/0084* (2013.01); *Y10T 137/7859* (2015.04)

(58) Field of Classification Search
CPC ..................................................... B01L 3/00
See application file for complete search history.

(56) References Cited

U.S. PATENT DOCUMENTS

| | | |
|---|---|---|
| 9,174,215 B2 | 11/2015 | Vulto et al. |
| 2003/0173650 A1 | 9/2003 | Larsson et al. |
| 2004/0231736 A1 | 11/2004 | Kim et al. |
| 2005/0118070 A1 | 6/2005 | Griss et al. |
| 2007/0225651 A1 | 9/2007 | Rosenberg et al. |
| 2008/0072964 A1 | 3/2008 | Kim et al. |
| 2014/0065597 A1 | 3/2014 | Vulto et al. |
| 2015/0238952 A1 | 8/2015 | Vulto et al. |

FOREIGN PATENT DOCUMENTS

| | | | |
|---|---|---|---|
| WO | WO 2006/061025 | | 6/2006 |
| WO | WO2012120101 | * | 9/2012 |

OTHER PUBLICATIONS

International Search Report for PCT/IB2014/064005 dated Jun. 1, 2015.
Written Opinion of the International Searching Authority for PCT/IB2014/064005 dated Jun. 1, 2015.
(Continued)

*Primary Examiner* — Jyoti Nagpual
(74) *Attorney, Agent, or Firm* — Marvin Petry; Stites & Harbison PLLC

(57) ABSTRACT

The present invention relates to a fluid triggerable passive valve for controlling flow of one or more fluids comprising:
a volume comprising at least two capillary pressure barriers for respectively pinning a first and second fluid-fluid meniscus,
the two capillary pressure barriers dividing the volume in at least three sub volumes, whereby two sub volumes being positioned upstream and one sub volume being positioned downstream with respect to the advancement direction of each respective fluid-fluid meniscus;
wherein the capillary pressure barriers are spaced apart such that upon pinning of a first fluid-fluid meniscus on a first capillary pressure barrier and arrival or pinning of a second fluid-fluid meniscus on or at a second capillary pressure barrier, the two menisci touch and thereby coalesce into one fluid-fluid meniscus.

20 Claims, 12 Drawing Sheets

(56) References Cited

OTHER PUBLICATIONS

Jessica Melin, et al., "A Liquid-Triggered Liquid Microvalve for On-Chip Flow Control", 2004, 6 pages, vol. 100, Sensors and Actuators B.

M. Zimmermann, et al., "Valves for Autonomous Capillary Systems", 2008, pp. 395-402, vol. 5, Microfluid Nanofluid.

Shuichi Jono, et al., "Matrix Gla Protien is Associated with Coronary Artery Calcification as Assessed by Electron-Beam Computed Tomography", 2004, pp. 790-794, vol. 91, Thromb Haemost.

A. Farzaneh-Far, et al., "Transcriptional Regulation of Matrix Gla Protein", 2001, pp. III/38-111/42, Z Kardiol 90: Suppl 3.

Johanna M. Geleijnse, et al., "Dietary Intake of Menaquinone Is Associated with a Reduced Risk of Coronary Heart Disease: The Rotterdam Study", 2004, pp. 3100-3105, vol. 134, The Journal of Nutrition.

Netherland Search Report for Patent Application 2011285 dated Apr. 7, 2014.

* cited by examiner

FLUID TRIGGERABLE VALVES

The present invention generally to microfluidic devices, particularly to valves employing capillary pressure barriers for controlling fluid flow within microfluidic channels.

BACKGROUND OF THE INVENTION

Microfluidic devices have recently become popular for performing analytic testing, fast screening reactions, but also many other biological and biomedical applications. Microfluidic technology can be used to deliver a variety of in vitro diagnostic applications at the point of care, including blood cell counting and characterization, calibration-free assays directly in whole blood; applications in drug discovery, synthetic chemistry, and genetic research. A further application resides in processing life-based organic particles including particles selected from the list comprising cells, cellular spheroids, tissues, eukaryotes, micro-organisms, organs or embryos, as for instance disclosed in WO-A-2012/120102, for e.g. for screening of new medical treatments.

There is growing scientific and industrial interest in capillary pressure barriers for controlling or influencing the behaviour of fluids, especially liquids or liquid-containing substances. Such capillary pressure barriers are of particular utility in the field of microfluidics, in which they are highly useful in controlling the flow of bodies of liquids in volumes the sizes and shapes of which are designed for specific purposes such as assaying, "aliquoting" i.e. the dispensing to or from a volume of a predetermined quantity of a liquid, mixing, separating, confining metering, patterning and containing. Effective passively exerted fluid flow control has become greatly sought-after to controlling liquids in large microfluidic circuits and liquids in microfluidic chambers. It would even be more desirable to be able to trigger such valves, such as by a second fluid. Published literature mentions valves in which two menisci trigger each others' advancement with the help of pinning barriers. US2005 0118070A1 describes a flow triggering device. In this disclosure a liquid meniscus is pinned on a pinning barrier. A second meniscus arrives after a delay and relieves the pinned state of the first liquid meniscus. This arrangement only works if one is sure of the order of arrival of the two liquid menisci. If this occurs in reverse order the second liquid does not become pinned and air will be entrapped in the device.

J. Melin et al., in "A liquid-triggered liquid microvalve for on-chip flow control", Sensors and Actuators B 100 (2004) 463-468, disclose a device in which either meniscus is pinned, whichever arrives first. Pinning is realized by two sharp edges that are patterned in the z-direction. Since the two pinning barriers have one sharp edge in common, the second meniscus, upon arrival, touches the first and thereby relieves the pinned state. A similar type of valve was disclosed by M. Zimmermann et al., "Valves for autonomous capillary systems", Microfluid Nanofluid (2008) 5:395-402

The fact that the devices require a common pinning barrier for allowing the double pinning function, while maintaining the overflow capacity upon presence of both meniscii, means that the common pinning barrier needs to be patterned in the z-direction, that is orthogonal to the plane on which the microfluidic network is patterned. This has the disadvantage that the pinning barrier is in practice always part of the microfluidic channel structure, and therefore compromises need to be made to the channel geometry. In fact, both publications require complex geometries that are implemented with deep reactive ion etching of silicon: an expensive, time-consuming procedure.

SUMMARY OF THE INVENTION

It is an object of the present invention to provide a valve within a microfluidic system which uses suitably engineered capillary pressure barriers to control the flow of a fluid stream within the microfluidic channels. It is also an object of the present invention to provide a valve within a microfluidic channel able to allow advancement of a fluid-fluid meniscus to occur upon presence of two fluid-fluid menisci at the valve. It is also an objective of the present invention to provide multiple valves in a network of microfluidic channels and determine breaching of a specified valve within the microfluidic network and/or the sequence of breaching of two or multiple valves.

Accordingly, in a first instance, the present invention relates to a fluid triggerable valve for controlling flow of one or more fluids comprising:

a volume comprising at least two capillary pressure barriers for respectively pinning a first and second fluid-fluid meniscus, the two capillary pressure barriers dividing the volume in at least three sub volumes, whereby two sub volumes being positioned upstream and one sub volume being positioned downstream with respect to the advancement direction of each respective fluid-fluid meniscus;

wherein the capillary pressure barriers are spaced apart such that upon pinning of a first fluid-fluid meniscus on a first capillary pressure barrier and arrival or pinning of a second fluid-fluid meniscus on arrival on a second capillary pressure barrier, the two menisci touch and thereby coalesce into one fluid-fluid meniscus.

In a second instance, the present invention relates to a microfluidic circuit including at least one microfluidic chamber and at least one fluid triggerable valve according to the present invention.

In yet a further aspect, the subject invention also relates to the use of a valve according to the invention for the control of microfluidic fluid flows, and to the process for the controlled release of a microfluidic flow, comprising providing at least a first and a second fluid stream to a microfluidic flow valve or circuit according to the invention, and increasing the pressure until the first and second fluid streams merge through operation of the valve.

These and other objects and advantages of the present invention will be readily apparent in the description that follows, and the dependent claims.

BRIEF DESCRIPTION OF THE DRAWINGS

These and further features can be gathered from the claims, description and drawings and the individual features, both alone and in the form of sub-combinations, can be realized in an embodiment of the invention and in other fields and can represent advantageous, independently protectable constructions for which protection is hereby claimed. Embodiments of the invention are described in greater detail hereinafter relative to the drawings, wherein:

DETAILED DESCRIPTION OF THE INVENTION

The subject invention relates to a particularly effective valve for the control of one or more fluid flows in microfluidic devices, by providing a controlled way for two moveable fluid-fluid menisci at least one of which is pinned on a capillary pressure barrier, also referred to as phaseguide, pinning barrier, hydrophobic patch, hydrophilic or hydrophobic barrier, depending on the actual materials and principles used. These types of barriers are species of the generic capillary pressure barriers, or capillary pressure barriers, as will be further referred to herein.

Independently from the actual choice for the type of barrier, each valve contains at least two capillary pressure barriers. The barriers are preferably spaced apart thus far that upon pinning and/or stretching of at least one of the two or both fluid-fluid menisci, the menisci touch each other, thereby coalescing and reducing the pressure required for breaching the capillary pressure barrier. Subsequently, breaching of the capillary pressure barrier may occur and the resulting meniscus is allowed to advance in downstream direction. This is further herein referred to as the bursting of the valve. The thus shaped valves are further referred to as "fluid triggerable valves", "touch valves", or simply "valves" herein.

The valve according to the invention preferably comprises one or more capillary pressure barriers and/or one or more stretching barriers for controlling the shape and/or position of a moveable fluid-fluid meniscus. The valve further preferably comprises a volume for containing and directing fluid, the filling direction being a downstream direction, including the menisci.

Along such a capillary pressure barrier, a fluid meniscus tends to align. This formation of a fluid/fluid interface in the form of a meniscus is typically referred to as "pinning", since the capillary pressure barrier and the meniscus define a boundary in the volume between at least two sub-volumes.

Preferably, the capillary pressure barrier may be stabilized by providing a stretching barrier at a distance less than the maximum stretching distance of the fluid-fluid meniscus upon alignment along the capillary pressure barrier in the absence of the stretching barrier, the stretching barrier being shaped such that at least one directional component is orthogonal to the capillary pressure barrier.

It is referred to stretching when a fluid-fluid meniscus perturbs into the volume beyond a virtual boundary plane defined by the capillary pressure barrier line and being normal to the substrate facing the capillary pressure barrier, while still being pinned on the capillary pressure barrier.

Figure 1:
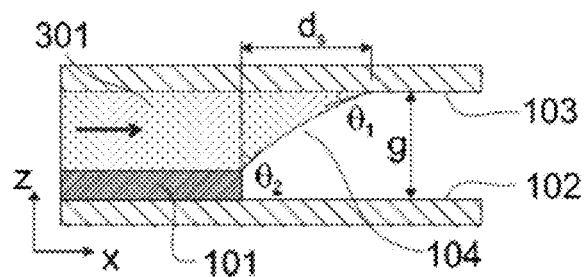
FIG. 1 is an illustration of a vertically sectioned view of a fluid-fluid meniscus pinned on a capillary pressure barrier

FIG. 1 shows a vertical section of a microfluidic channel, whereby a capillary pressure barrier 101 is patterned on the bottom substrate 102. A fluid 301 is pinned on the capillary pressure barrier and stretches along the top substrate 103 over a length of $d_s$. The maximum stretching distance $d_s$ of a fluid-fluid meniscus 104 can be approximated by the formula, assuming that the mid-point of the contact line stays pinned at the edge of a capillary pressure barrier in the form of a phaseguide at the onset of overflow:

$$d_s = g\left(\frac{\cos\theta_2 - \sin\theta_1}{\cos\theta_1 - \sin\theta_2}\right) \quad (I)$$

wherein g represents the gap between the substrate on which the pinning barrier is present and the counter substrate, $\theta_1$ and $\theta_2$ represent the contact angles with the material of the counter substrate 103 and the pinning barrier materials respectively.

Once the capillary pressure barrier is patterned close to a stretching barrier, e.g. a bending of the channel wall at a distance that is less than its maximum stretching distance, the meniscus cannot fully stretch thus increasing the energy required to breach the capillary pressure barrier.

The term "orthogonal" herein refers to at least one component of the stretching barrier being provided at a wall or surface of the volume in a direction that is orthogonal to the capillary pressure barrier. In a typical example where the capillary pressure barrier is present on a bottom substrate, the orthogonal component of the stretching barrier means that its boundary shape can be dissected in at least one component that is perpendicular to the substrate on which the capillary pressure barrier is present. For example if the capillary pressure barrier is patterned on a substrate in a plane that stretches in x and y direction, than the plane is fully defined by it z-coordinate only. The stretching barrier is defined at least by an x and/or a y coordinate in order to have an orthogonal component with respect to the capillary pressure barrier boundary line. The stretching barrier may also comprise other components which are not orthogonal to the capillary pressure barrier. This is of less importance as long as there is a component perpendicular to the substrate.

For the avoidance of doubt, a capillary pressure barrier may have a non-rectilinear shape, while still an orthogonal component can be found of the stretching barrier with respect to the capillary pressure barrier.

The stretching barrier is typically located on a plane with which the capillary pressure barrier intersects, i.e. a wall when the capillary pressure barrier is present on the bottom substrate.

In the case of a non-planar microfluidic channel geometry, the orthogonal component may be defined as being a component that is orthogonally spaced towards a reference vector defined by the first derivative (direction) of the capillary pressure barrier line at the intersection with the wall. Without wishing to be bound to any particular theory, it is believed that a fluid/fluid meniscus will pin to the capillary pressure barrier, and in the process of stretching aligns at least in part to the stretching barrier, thereby forcing the meniscus to take on an energetically less beneficial shape and requiring increased pressure as to breach the capillary pressure barrier as would have been the case when the stretching barrier were not present and the meniscus could fully stretch. This principle may advantageously be applied in any shape of a microfluidic channel.

In the valve according to the invention, upon coalescence of the two fluid-fluid menisci, the pressure required for breaching the pinned state of the resulting fluid-fluid meniscus is preferably lower than the pressure required for breaching the pinned state of one or more fluid-fluid meniscus before coalescence. Preferably, upon coalescence of the two fluid-fluid menisci the pinning of the resulting fluid-fluid meniscus is breached and the meniscus is permitted to advance in downstream direction. Preferably, at least one of each sub-volumes comprises or is a microfluidic channel.

The touch valve advantageously can be operated by a means for increasing pressure of at least one of the fluid streams to stretch one or more of the menisci.

The term "coalescence" herein refers to a process wherein two fluid menisci merge into one resultant fluid-fluid meniscus. The term however may also include the process wherein two fluids of different mobility, e.g. due to a difference in viscosity, may come into contact, whereby then the lower viscous fluid typically wets the surface of the higher viscous fluid, thereby forming an at least initially inhomogeneous resultant combined fluid stream.

The touch valve further preferably comprises at least one upstream channel and at least one downstream channel provided in fluid connection to the volume. It further comprises at least one downstream channel for holding the resultant meniscus and enabling advancement of the resultant meniscus and fluid stream. The valve preferably comprises at least two upstream channels each comprising one of the capillary pressure barriers for pinning a meniscus.

The one or more capillary pressure (alignment) barrier in the valve preferably comprises one or more of: a) a recess or groove defined in the material of a wall of the volume; b) a protuberance from a wall of the volume into the volume; and/or c) a line defined in the material of a wall of the volume that is of lower wettability than the material of the wall adjacent the line.

A typical implementation of capillary pressure barriers uses a hydrophilic top substrate, i.e. glass and a less hydrophilic pinning barrier, i.e. a plastic or a photoresist. Another capillary pressure barrier could be a line of material that has a lower wettability with respect to the surrounding material. Also in this case the line functions as an capillary pressure barrier, whose stability upon alignment is determined by its wall angle and/or the presence of a stretching barrier. Such a line may be a hydrophobic material such as Teflon, and also materials that are still in the hydrophilic domain, such as SU-8 photoresist.

Capillary effects are most effective when the distance between the capillary pressure barrier and the counter-substrate is small. Typically this distance is smaller than 1 mm, and preferably 500 µm or smaller, or smaller than 200 µm.

A protrusion barrier functions most effectively as a stable capillary pressure barrier when the angle of the side wall with its counter-substrate is close to 90°, equal to 90° or even larger than 90°.

In practice, when using plastic processes, such as milling or injection moulding, the side wall profile will have a draft angle that that is defined as offset from a 90° angle between the side wall and an in-use bottom substrate. The draft angle is required to be able to release an injection moulded component from its negative master. Straight wall profiles would create difficulties in doing this, while a negative draft angle locks the injection moulded component into its negative master and cannot be released without breaking or deforming either the master or the injection moulded device. A typical draft angle for release in injection moulding is between 6° and 8°. It is important to maintain the draft angle as small as possible for a stable capillary pressure barrier. The range of materials that may be used to create such a capillary pressure barrier is very large and includes thermoplastics or thermosetting polymeric materials such as PDMS, polyacrylamide, cyclic olefin copolymers, polystyrene, polyacrylic materials, epoxy resins based materials, polycarbonates; photoresists, i.e. light-sensitive materials that form a patterned coating on a surface, which may be advantageously done by a process such as photolithography and photoengraving; silicon, glass, metals, and many other materials. These materials can be used both monolithically or in combination. At least one of the capillary pressure barriers in the touch valve advantageously represents a stable capillary pressure barrier, preferably both are stable pinning barriers.

A particularly useful touch valve is created when each capillary pressure barrier has a high stability. In a preferred embodiment, particularly stable capillary pressure barriers may be achieved by providing at least one capillary pressure barrier present in the valve is stabilized by (a) subtending at both ends an angle with a wall of the volume that on the downstream side of the capillary pressure barrier is greater than 90°, and/or (b) wherein the capillary pressure is stabilized by providing a stretching barrier at a distance less than the maximum stretching distance of the fluid-fluid meniscus upon alignment along the capillary pressure barrier in the absence of the stretching barrier, the stretching barrier being shaped such that at least one directional component is orthogonal to the capillary pressure barrier and/or (c) the capillary pressure barrier is stabilized by subtending at one end an angle with a wall of the volume that on the downstream side of the capillary pressure barrier is greater than 90°, and at the other end is stabilized by providing a stretching barrier at a distance less than the maximum stretching distance of the fluid-fluid meniscus upon alignment along the capillary pressure barrier in the absence of the stretching barrier, the stretching barrier being shaped such that at least one directional component is orthogonal to the capillary pressure barrier. Preferably there is no location of deliberate weakness, as provided by a sharp V-shaped bend or a branch along the capillary pressure barrier that reduces the stability of the capillary pressure barrier.

The capillary pressure barrier is preferably defined by or includes one or more of:
i) a recess or groove defined in the material of a wall of the volume; ii) a protuberance from a wall of the volume into the volume; and/or
iii) a line defined in or on the material of a wall of the volume that is of lower wettability than the material of the said wall adjacent the line.

Preferably, the stretching barrier is defined or includes one or more of:
iv) a recess or groove defined in the material of a wall of the volume; v) a protuberance from a wall of the volume into the volume; vi) a bend or recess opening into a further channel or reservoir; vii) a line defined in or on the material of a wall of the volume that is of lower wettability than the material of the said wall adjacent the line. Advantageously, the two capillary pressure barriers are stabilized by at least one common stretching barrier. Preferably, coalescence of the two menisci results in breaching the at least one common stretching barrier in this valve.

Advantageously, the distance that the two capillary pressure barriers are spaced apart is less than twice the maximum stretching distance of each fluid-fluid meniscus that is pinned on one said capillary pressure barrier in the absence of the second fluid-fluid meniscus.

The maximum stretching distance, $d_s$, is defined by formula I:

$$d_s = g\left(\frac{\cos\theta_2 - \sin\theta_1}{\cos\theta_1 - \sin\theta_2}\right), \quad (I)$$

wherein g represents the distance between the first substrate on which the first capillary pressure barrier is provided and the second substrate facing the substrate on which the first capillary pressure barrier is provided;
wherein $\theta_1$ represents the contact angle of the fluid with the material of the substrate facing the first capillary pressure barrier; and wherein $\theta_2$ represents the contact angle of the fluid with the capillary pressure barrier material.

Preferably, the valve comprises a volume, which comprises two capillary pressure barriers for holding two fluid-fluid menisci and an intermediate volume defined by the two capillary pressure barriers and the menisci once pinned, wherein the two capillary pressure barriers converge at a minimal distance at least at one point thereby reducing the intermediate volume for allowing the menisci to contact at this point upon pinning of both menisci and/or stretching of at least one meniscus.

Yet further, preferably the valve comprises means for increasing pressure of at least one of the fluid streams to stretch one or more of the menisci, or these means are present in an apparatus or circuit.

The present invention also relates to microfluidic circuits including at least one microfluidic chamber and at least one fluid triggerable valve according to the invention.

The present invention also relates to a circuit preferably comprises at least two fluid triggerable valves, wherein the first valve requires a different pressure required to burst with respect to the second valve, thereby allowing a selective operation of valves by pressure changes. The distance between the two capillary pressure barriers contained by the first valve may advantageously differ from the second valve. Also, the distance between the at least one capillary pressure barrier and at least one stretching barrier contained by the first valve may advantageously differ from that of the second valve.

For most typical applications of this invention the fluid-fluid meniscus refers to a meniscus between an aqueous liquid and air, however the invention also may be used for any fluid-fluid configuration that has a stable meniscus, i.e. the two fluids are immiscible. Examples include any gas-liquid or oil-water interfaces.

For the case of a gel, the patterning of the gel takes place prior to gelation, i.e. when the gel is a fluid.

The various uses of the valve and circuit or array described herein include methods of controlling the shape and/or position of moveable fluid-fluid menisci in the valve according to the invention as defined or described herein, the method comprising the step of causing the menisci to align along the capillary pressure barriers, and applying pressure to stretch at least one of the menisci to touch and coalesce with the other meniscus, thereby forming a resultant meniscus and fluid stream.

The use of the valve allows operating a system with in principle highly stable capillary barriers, which typically would require a much higher pressure to overcome the pinning forces, whereby the barriers are overcome by the coalescence of the fluid streams, resulting in a catastrophic failure of the barriers at this point. This permits to ensure that fluid streams remain in place until a) either a second meniscus is present that opens the, i.e. "bursts" the valve, or by increasing the pressure once two menisci are present to stretch at least one, or both, to coalesce and hence burst the valve. However, the touching concept functions also in monolithic materials.

The valving concept functions for both menisci with a concave as well as a convex profile in vertical section, provided that the sum of the pressure contributions of the various radii of a single meniscus somewhere during advancement becomes positive and thus requires external pressure application in order to advance the meniscus.

The examples disclosed herein illustrate the use of pinning barriers, in which the pressure over a meniscus increases were it to advance singularly over the pinning barrier, based on a change in geometry. However, the valving principle also works for less hydrophilic or hydrophobic patches. The difference with a pinning barrier is that pinning occurs on the downstream edge/wall of the pinning barrier, while the barrier function of a hydrophobic or less-hydrophilic barrier occurs at the upstream side of the barrier. In such case, the stretching distance of the latter needs to be calculated from the edges of the upstream side of the barrier.

The valve according to the invention further comprises at least one downstream channel for holding the resultant meniscus and enabling advancement of the resultant meniscus.

For a glass top substrate, a channel height of approximately 120 μm and capillary pressure barrier consisting of a 30 μm ridge with a contact angle in the range of 70° for an advancing liquid air meniscus, the two capillary pressure barriers are preferably spaced apart by a distance of from 50 to 200 micrometers, preferably 85 to 150 micrometers, at least one point of the barriers.

The present invention also preferably relates to a microfluidic circuit comprising at least two pressure triggerable valves, wherein the pressure required to burst the first valve is different from the pressure required to burst the second valve, thereby allowing a selective operation of valves by pressure changes.

The present invention also preferably relates to the use of a touch valve for the control of microfluidic fluid flows, and to a process for the controlled release of a microfluidic flow, comprising providing at least a first and a second fluid stream to a microfluidic flow valve or circuit set out herein above, and increasing the pressure until the first and second fluid stream merge through operation of the valve.

Although for many applications it is of importance that the capillary pressure barrier is of particular stability, it need not be the strictly case according to the invention. A capillary pressure barrier is of use for the invention as long as it has actual barrier capacity, i.e. external pressure is required to breach the barrier in absence of a second meniscus.

Various principles for and examples of creating stable capillary pressure barriers are disclosed in co-pending application NL-A-2011280, which is incorporated by reference herein

DETAILED DESCRIPTION OF THE DRAWINGS

FIG. 1 describes the stretching distance of a single fluid-fluid meniscus in vertical cross section. The maximum stretching distance of the liquid-air meniscus can be approximated by formula (I), assuming that the mid-point of the contact line stays pinned at the edge of the capillary pressure barrier at the onset of overflow, as set out above.

In FIG. 1, the meniscus is pinned on the edge of the capillary pressure barrier. This does not represent the maximum stretching distance, as the meniscus can be stretched further by travelling downwards from the capillary pressure barrier and reaching its maximum just shortly before touching the bottom substrate. However for illustration purposes, FIG. 2 is a simplified depiction showing the meniscus pinned on the edge of the capillary pressure barrier.

Figure 2:
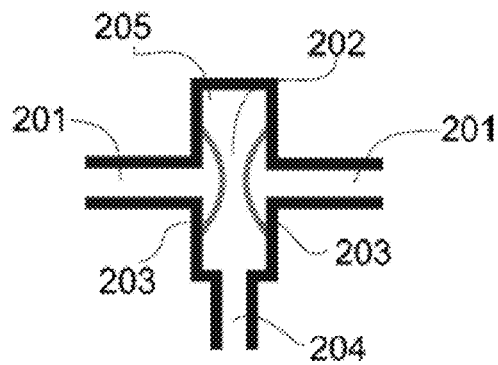
FIG. 2 is an illustration of horizontally sectioned view of an exemplary embodiment of a fluid triggerable valve according to the invention

FIG. 2 shows a concave meniscus profile, indicating that the sum of the contact angles $\theta_1$ and $\theta_2$ is smaller than 90°. However this need not be the case, as also for a convex meniscus shape the valving principle remains valid.

Referring now to FIG. 2, there is shown an illustration of a microfluidic channel as an exemplary embodiment, in which the volume is comprised by two inlet channels 201 that are facing each other at the intersection with a common downstream channel 204 and forming a T-shape. The downstream channel furthermore contains a dead-end extension 205 ulterior to the T-crossing.

A curved capillary pressure barrier 203 is patterned in the downstream channel spanning the distal end of each inlet channel and subtending an angle between the wall and the capillary pressure barrier that is larger than 90°. The distance between the two capillary pressure barriers being less than the sum of the maximum stretching distances of the two fluid-fluid menisci, such that upon stretching of one or both liquids, bursting occurs.

Figure 3:
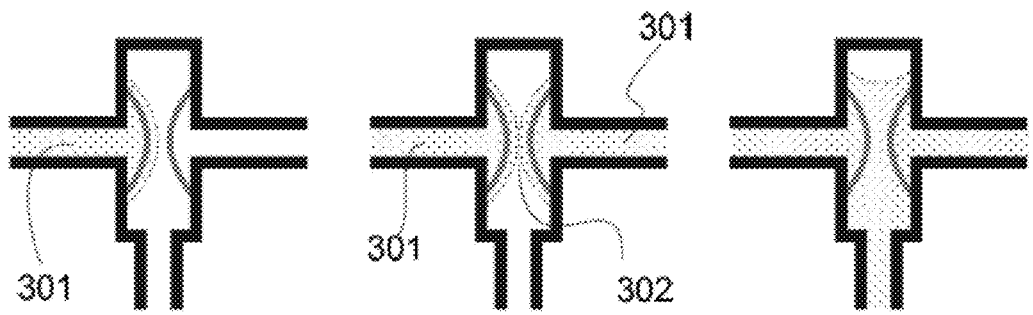
FIG. 3 shows a sequence of images demonstrating the operation of the valve of FIG. 2

FIG. 3 shows a sequence of images depicting the operation of the embodiment of FIG. 2. A first fluid 301 is present in the first channel 201 and pinned on a first capillary pressure barrier 203. Upon pinning of a second fluid 301 on the second capillary pressure barrier 203, the two menisci touch at point 203, followed by coalescence of the two menisci and filling of the downstream channel 204.

FIG. 1, illustrates a preferred embodiment, wherein a spherical capillary pressure barrier shape and the dead-end extension depict an optional examples of creating a touch valve.

The stability of each capillary pressure barrier may also be assured by a large capillary pressure barrier-wall angle through a notch, inlet, or the like.

The two inlet channels do not necessarily need to face each other, but may have a certain offset with respect to the position where they intersect the downstream channels, forming a double-T junction.

Also the two inlet channels may intersect the downstream channel under a certain angle, forming for example a Y-shape or similar.

The distance for the menisci to touch is preferably determined from the meniscus formed without pressure to the furthest extension of a meniscus without bursting the capillary pressure barrier and in absence of the second meniscus.

A further type of particularly stable touch valve may advantageously be created by patterning an capillary pressure barrier at a distance from an acute bending of the channel wall that is less than the stretching distance of the fluid-fluid meniscus in the absence of such an acute bending.

As disclosed in WO-A-2012/120101, and co-pending application NL-A 2011280, this may advantageously be done in a variety of ways.

Figure 4:
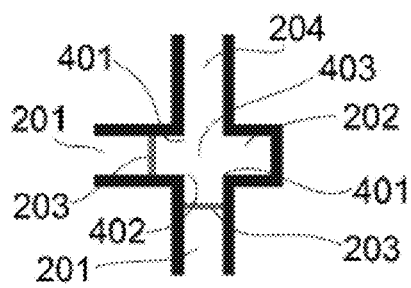
FIG. 4 is a horizontally sectioned view of an exemplary second type of fluid triggerable valve according to the invention

FIG. 4 discloses a preferred embodiment of a touch valve that is throughout the document referred to as orthogonal touch valve based on two channels crossing, where at the upstream side capillary pressure barrier 203 is present. Upon stretching the two menisci touch and bursting occurs, thereby relieving the coalesced meniscus from the capillary pressure barriers. The volume consists of two inlet channels 201, one outlet channel 204 and one dead-end channel 202. The distal end of each upstream channel is spanned by an capillary pressure barrier 203 that is patterned at a position relative to an acute bending 401, 402 of each channel wall with which the capillary pressure barrier has an intersection. The bendings 401, 402 represent a stretching barrier thereby realizing a particular stable barrier. The two capillary pressure barriers are furthermore positioned such that upon stretching, the menisci touch each other at the position of the common stretch barrier 402, thereby uniting the two menisci merging into one meniscus, relieving the pinned state and allowing progress of the meniscus in downstream direction (bursting).

Figure 5:
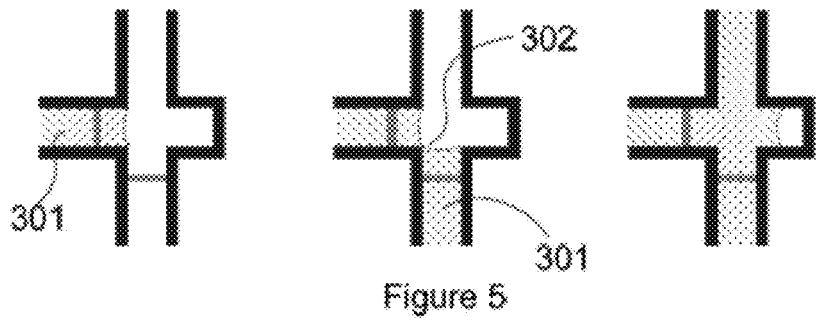
FIG. 5 shows a sequence of images demonstrating the operation of the valve of FIG. 4.

FIG. 5 shows a sequence of images depicting the operation of the embodiment of FIG. 4. A first fluid 301 is present in the first channel 201 and is pinned on a first capillary pressure barrier 203. Upon pinning of a second fluid 301 on the second capillary pressure barrier 203, the two menisci touch at a point 203 along the common stretching barrier, followed by coalescence of the two menisci and filling of the downstream channel 204.

The bending enables a stretching barrier that is orthogonal to the alignment pinning barrier. Such double barrier function can also be realized through other means as extensively described WO-A-2012/120101 and NL-A-2011280.

Orthogonality of the two barriers is not strictly necessarily, as long as there is an orthogonal component to it. For example, the sidewall may have a draft angle of for instance 8°. This is a typical draft angle for injection moulding. The acute bend in conjunction to a capillary pressure barrier still represents a stabilizing factor to the meniscus.

The above two examples show a valve that is of significant stability, once only one liquid is pinning on the capillary pressure barrier, but it bursts once the second meniscus becomes pinned on the second capillary pressure barrier, stretches and touches the first liquid meniscus. This is similar to a logic "AND" gate.

It is clear that the distance between the two capillary pressure barriers can be chosen such, that the touch valve functions by capillary force only, or that external pressure needs to be applied for meniscus stretching and subsequent bursting. A way of tuning this is by varying the distance between the two capillary pressure barriers with respect to one another in the example of FIG. 2 or with respect to the stretching barrier in the example of FIG. 4.

An extreme example of two above-described touch valves of particular stability is when the angle α becomes 180° or when the distance of the capillary pressure barriers to the stretching barrier becomes 0. These two cases represent effectively the same situation.

Figure 6:
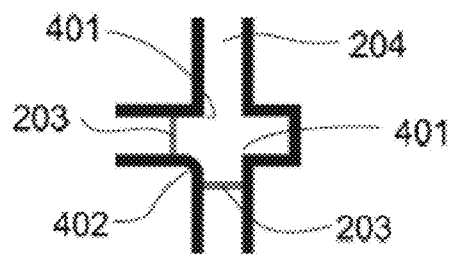
FIG. 6 is a horizontally sectioned view of another exemplary embodiment of a fluid triggerable valve according to the invention

Referring now to FIG. 6, there is shown an advantageous variation of the orthogonal touch valve of FIG. 5, wherein the corner 402 the two capillary pressure barriers have in common is rounded. This reduces the pressure required for the two menisci to touch one another.

Figure 7:
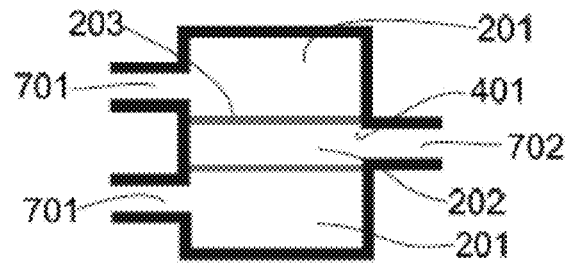
FIG. 7 shows a horizontally sectioned view of an exemplary embodiment in which the fluid triggerable valve principle is used for connecting two fluids in a chamber
Figure 9:
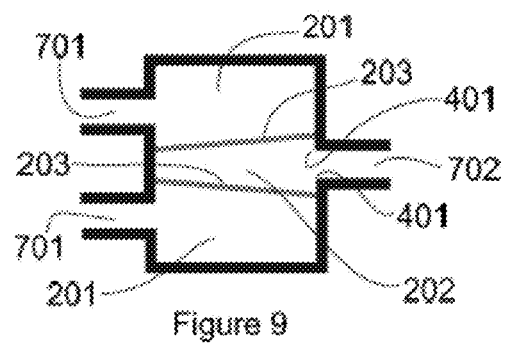
FIGS. 9 and 10 shows horizontally sectioned views of two other exemplary embodiments in which the fluid triggerable valve principle is used for connecting two fluids in a chamber.
Figure 10:
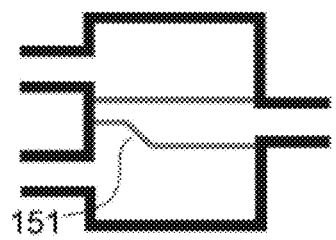

It is not in all cases required to utilize capillary pressure barriers that boast the stability as described above. FIGS. 7, 9 and 10 show additional embodiments that fulfil the function of a touch valve according to the present invention. In these examples shown, each capillary pressure barriers has a stable side and a less stable side, where bursting is meant to occur. Typically this bursting position is chosen distal to the downstream channel, such that no air-pockets remain trapped in the channel.

Figure 8:
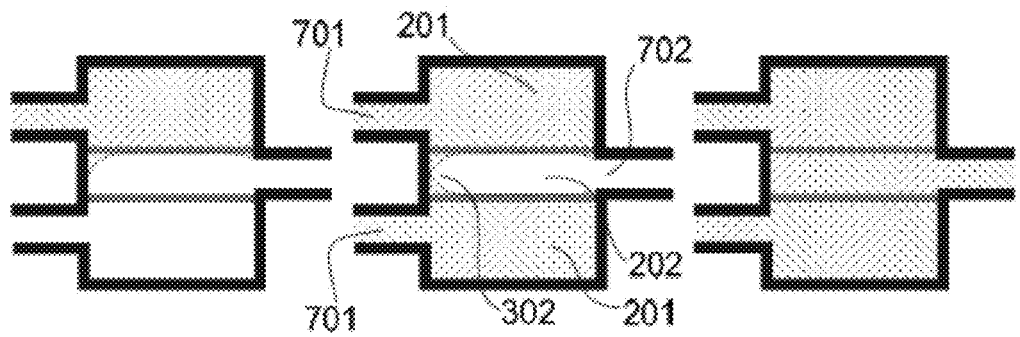
FIG. 8 shows a sequence of images demonstrating the operation of the valve concept of FIG. 7.

FIG. 7 shows a preferred embodiment in which two straight capillary pressure barriers are positioned within stretching distance from one another. FIG. 8 shows a sequence of images depicting the operation of the embodiment of FIG. 107. The bursting position 302 is here defined by the stretching along the wall that interfaces with both capillary pressure barriers and is distal from the downstream channel.

The other end of the capillary pressure barrier interfaces with a wall with a bend 401 within stretching distance, thus realizing a stretching barrier and stabilizing that side of the capillary pressure barrier.

Alternatively the capillary pressure barriers could be tilted towards each other, as is shown in FIG. 9 in an exemplary embodiment, or one barrier has a curve 151 such that a bursting position is defined, as is shown in FIG. 10 in an exemplary embodiment. FIGS. 7, 9 and 10 are typical preferred embodiments for so called "liquid" or "fluid lamination".

In fluid lamination, fluids are positioned one next to the other, to achieve orderly lanes of fluids in a chamber. A variety of fluid lamination embodiments have already been disclosed in WO-A-2010/086179, EP-A-2213364 and WO-A-2012/120101. The embodiments disclosed in these publications make use of a controlled position of overflow, by including a deliberate weakness through a branch, v-shape or small capillary pressure barrier-wall angle.

The touch valve line-up according to the present invention may advantageously achieve the same using a touch valve principle. In this case, the bursting position is determined by a place where the distance somewhere at a point between the two capillary pressure barriers 203 is sufficiently small that upon stretching of at least one pinned fluid-fluid meniscus, the fluid-fluid meniscus touches the second meniscus and the valve bursts.

The bursting position 302 is typically chosen distal to a venting channel 702, such that upon bursting the two fluid menisci unite, thereby filling the full volume 202 between the two capillary pressure barriers.

The lamination of fluids could follow any shape, e.g. could be laminated diagonally in the chamber or semicircular. Clearly, the touch valve principles of FIGS. 10 to 12 could also be used in routing schemes.

Preferably, in such line-up, the two capillary pressure barriers do not cross or touch at the position where fluid is actually pinned.

Another important aspect is that the two capillary pressure barriers do not subtend angles below the critical angle as defined by the Concus-Finn theorem. This might involve angles of e.g. an angle between the capillary pressure barrier and the wall, sharp bend or angle with a branch as extensively described in WO-A-2010/086179, as such an angle would imply immediate overflow also in the absence of a second meniscus.

The capillary pressure barrier configurations leading to a touch valve in the embodiments of FIGS. 7, 9 and 10 are meant for liquid lamination in microfluidic chambers. However, same configurations could be used for routing of liquids through a circuit of microfluidic channels.

Figure 11:
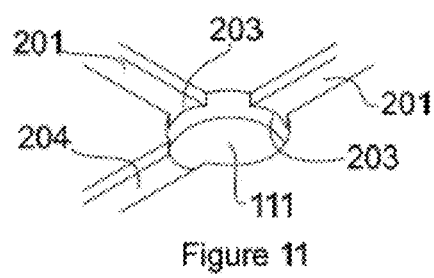
FIG. 11 shows yet another exemplary embodiment of a fluid triggerable valve according to the invention
Figure 12:
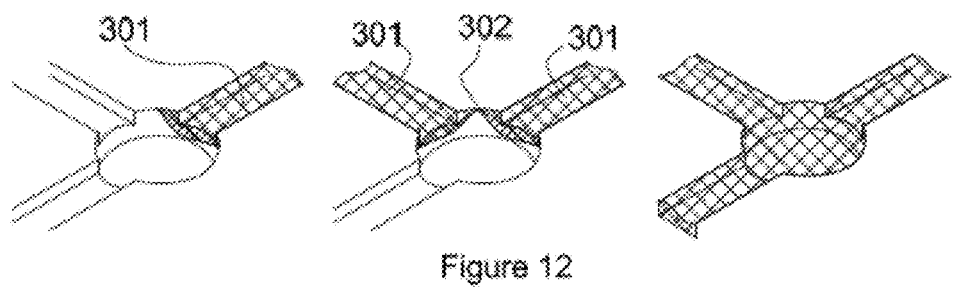
FIG. 12 shows a sequence of images demonstrating the operation of the valve of FIG. 11.

FIG. 11 shows yet another preferred embodiment, as an example of an orthogonal touch valve. The valve comprises again a T-junction consisting of two orthogonally positioned incoming channels 201 and one outgoing channel 204. A circular shape 111 is super-positioned over the junction and has a increased depth with respect to the depth of the channels 201, such that a capillary pressure barrier 203 is created. The larger the diameter of the round shape, the more liquid stretching is required before the two menisci touch. This is illustrated in a sequence of images of operation in FIG. 12. The valve volume may have a circular shape, however could also be of a different shape, such as a for instance a square shape. Also the upstream channels need not necessarily to be orthogonal as depicted, but could be facing each other as well, or at a different angle. A particular advantage of the touch valve as depicted in FIG. 9 is its ease of manufacture with milling techniques, whereby channels can be milled with small mills or drills, while the circular shape can be superimposed using a larger mill or drill.

Figure 13:
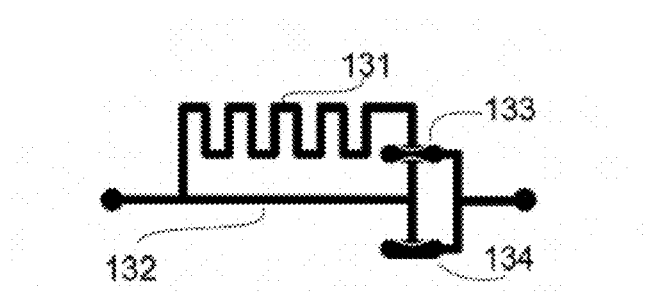
FIG. 13 is an illustration of an example of a long and a short microfluidic channel connected through a fluid triggerable valve in the embodiment of FIG. 2.
Figure 14:
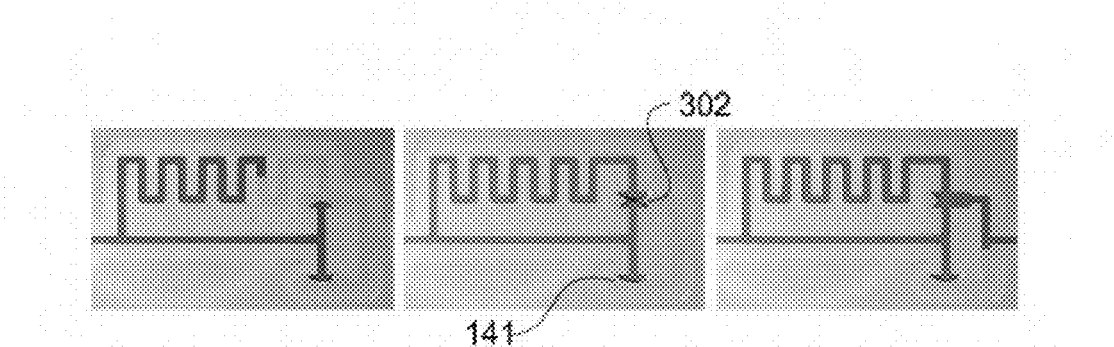
FIG. 14 shows a sequence of experimentally obtained images demonstrating the operation of the structure of FIG. 13.

Referring now to FIG. 13, which shows an example of a long 131 and a short channel 132 that are connected through a touch valve 133 that is similar to the embodiment shown in FIG. 2. The circuit furthermore contains a stable capillary pressure barrier 134 that is used as a reference. FIG. 14 shows a sequence of experimentally derived images demonstrating the operation of the embodiment of FIG. 13. Clearly, the short channel fills much faster than the long channel. The meniscus gets pinned on one half of the touch valve until the second channel has filled, the second meniscus pinned and eventually stretched such that the two menisci touch. Upon touching the two liquids unite and the meniscus proceeds in downstream direction. The fact that the stable pining barrier 134 is not breached, demonstrates that it is the touching of the menisci that is crucial for bursting the valve and not breaching of individual capillary pressure barriers.

Figure 15:
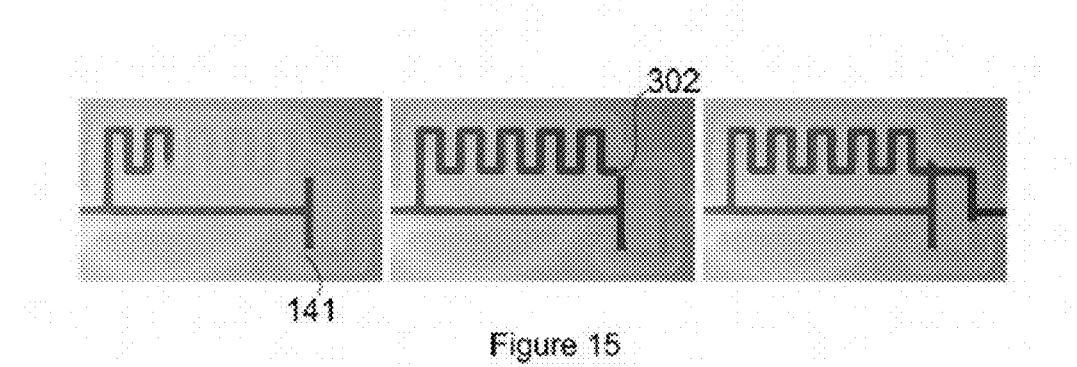
FIG. 15 shows a sequence of experimentally obtained images demonstrating the operation of the structure that is slightly modified from the one shown in FIG. 13.

FIG. 15 shows a sequence of experimentally derived images that demonstrate the operation of an embodiment that is slightly modified from the embodiment of FIG. 13. In FIG. 15 the touch valves 133 are orthogonal touch valves similar to the embodiment of FIG. 5. The results are similar to the ones of FIG. 14.

Figure 16:
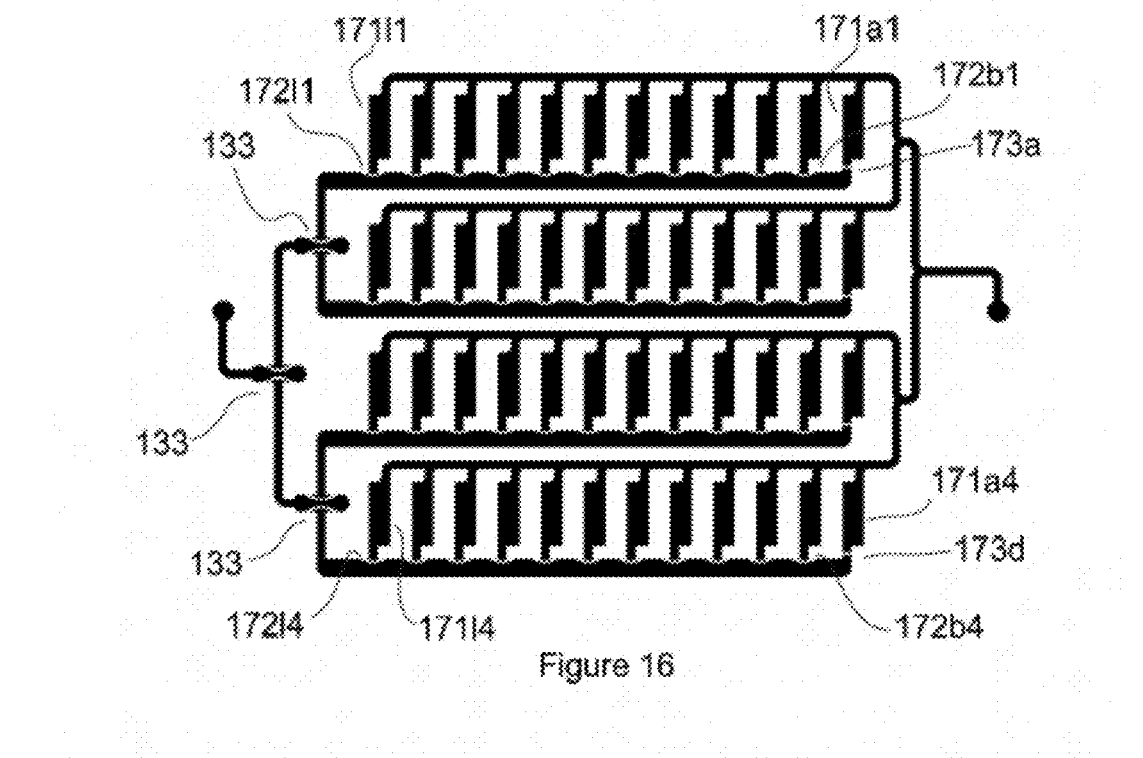
FIG. 16 is an illustration of a branched network of 4 microfluidic channels with 14 fluid chambers joined through a series of 3 fluid triggerable valves in the embodiment of FIG. 2.
Figure 17:
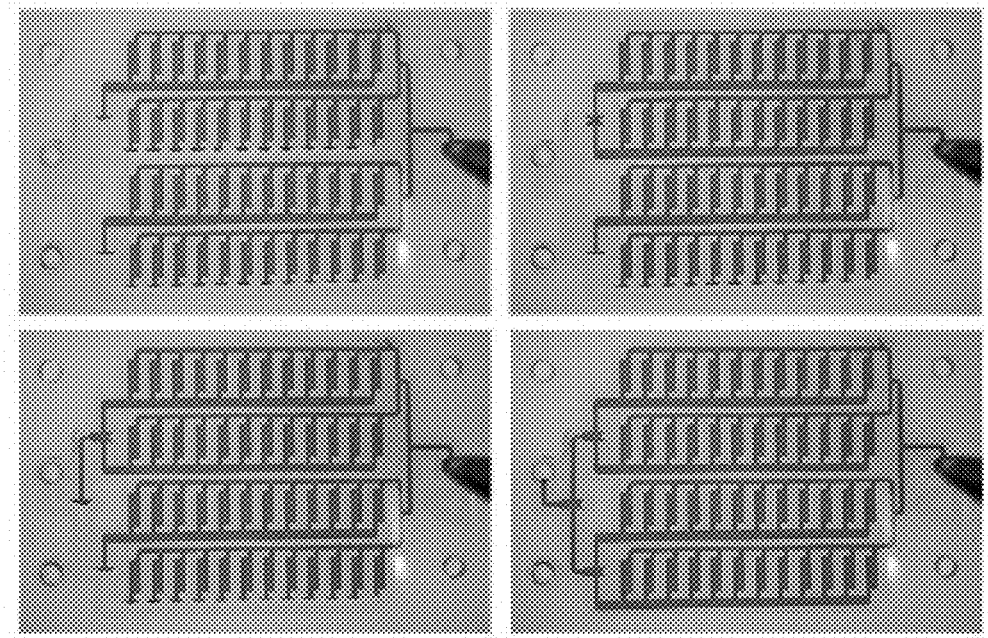
FIG. 17 shows a sequence of experimentally obtained images demonstrating the operation of the structure of FIG. 16.

FIG. 16 and FIG. 17 shows another example of a microfluidic circuit or network and sequence of experimentally derived images demonstrating the operation thereof. Here a network consisting of 4 lanes of 14 chambers are joined together in pairs by means of a touch valve 133 similar to the one shown in FIG. 2. In absence of a touch valve according to the invention, it would be difficult to predict in such a network which channel system would fill first and most probably air pockets will be trapped during the filling process. Here, the touch valve assures that each network is filled prior to joining of the menisci and advancement thereof. Thus, no air will typically be trapped in the network.

FIG. 16 thus shows a further example of application of the valve disclosed in FIG. 2, which may be of particular use and interest as here each pathway from entrance to exit has the same hydrodynamic resistance. Thus, upon applying a continuous flow, it may be expected that the flow is equal in each chamber. This might be of use, for instance when perfusing cell cultures in each chamber, or embedded in a gel adjacent to each chamber.

Figure 18:
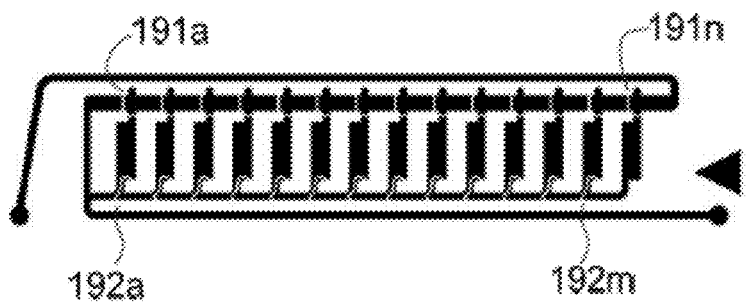
FIG. 18 is an illustration of a different example of a branched network in which 14 chambers joined through a series of 14 fluid triggerable valves in the embodiment of FIG. 4.
Figure 19:
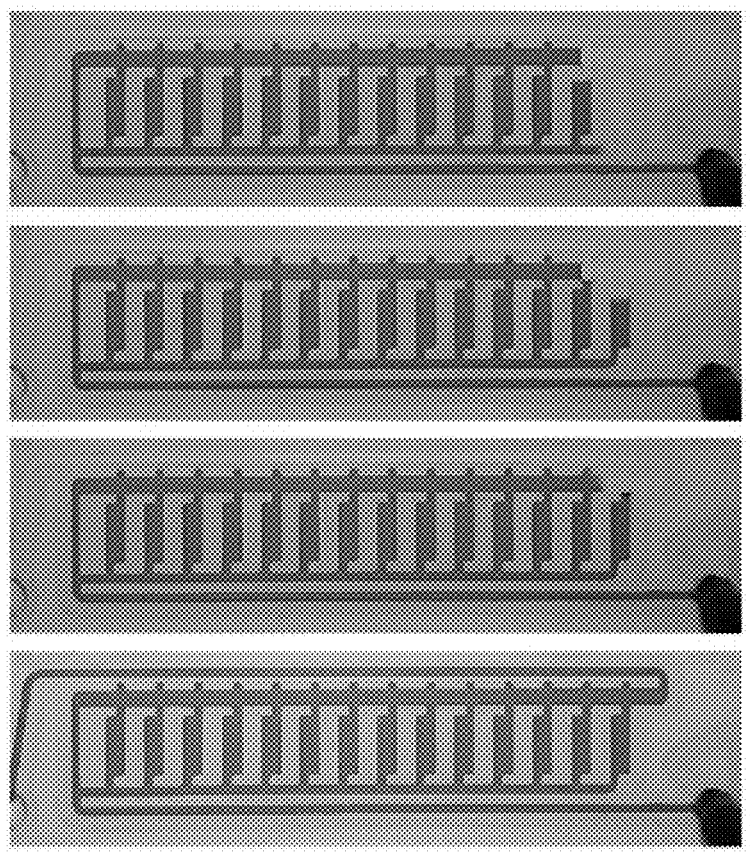
FIG. 19 shows a sequence of experimentally obtained images demonstrating the operation of the structure of FIG. 18.

FIG. 18 shows a particular embodiment in the form of a circuit or network of 14 chambers being filled with the help of an orthogonal touch valve 191 similar to the one shown in FIG. 4. On the downstream-side of each chamber an orthogonal touch valve 191a-n is present, such that liquid only advances when a meniscus is present on both sides of the touch valve. The network further comprises capillary pressure barriers 192a-m that assure a sequential filling of chambers. FIG. 19 shows the operation of the device by means of a sequence of experimentally derived images.

Figure 20:
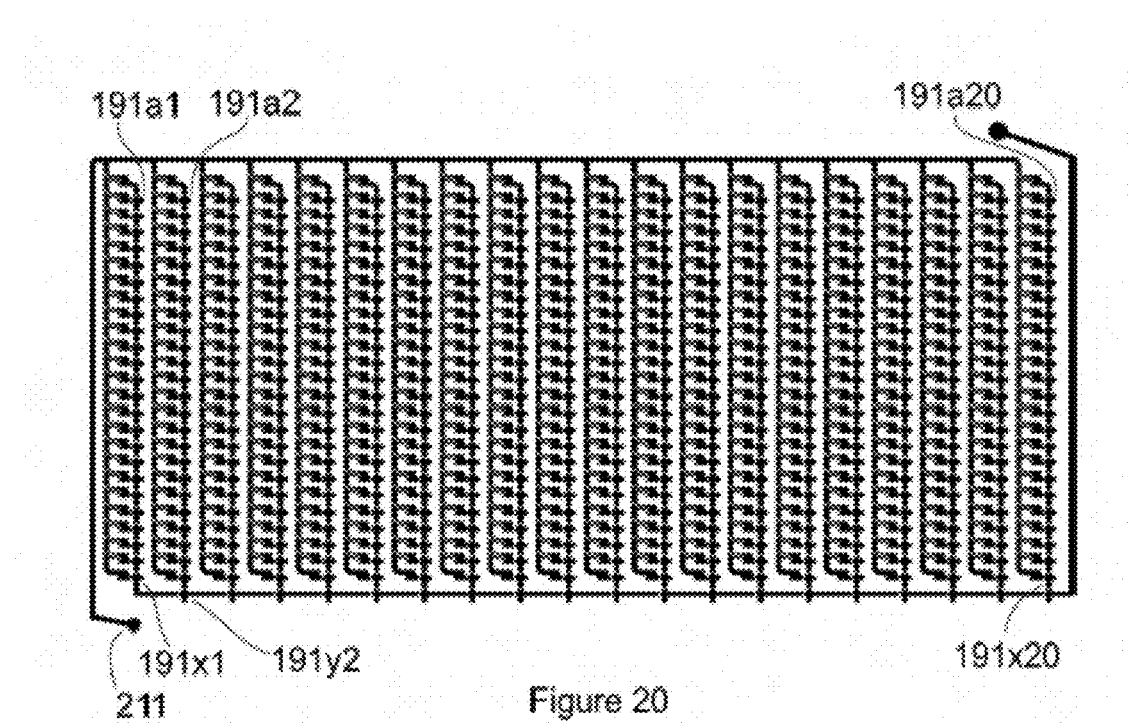
FIG. 20 is an illustration of a different example of a branched network showing 20 rows of 25 chambers each, all chambers and rows are connected through a series of fluid triggerable valves.
Figure 21:
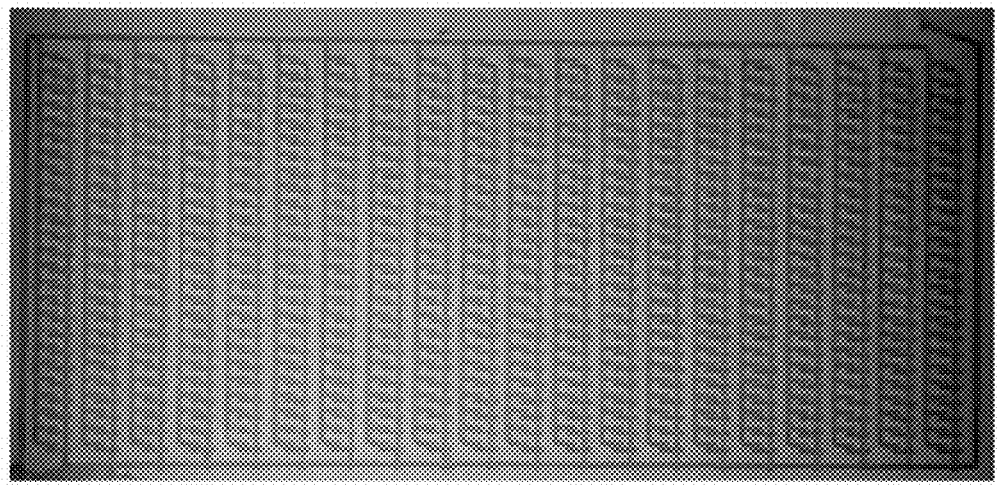
FIG. 21 shows an experimentally obtained image of the network of FIG. 20 upon filling of all 500 chambers.

FIG. 20. shows a particularly convincing example of the strength of the touch valve concept, wherein 20 rows of 25 chambers each are connected through a series of orthogonal touch valves 191a1 to 191x20, yielding filling of 500 chambers in one shot. Each chamber has a double touch valve 191 similar to the embodiment depicted in FIG. 4 on its downstream side, which is also the case for each row. FIG. 21 shows an experimentally derived image of the embodiment of FIG. 20 upon filling of all 500 chambers. This example demonstrates that large arrays of micro chambers and channels can be filled from one fluid access point 211 only.

Figure 22:
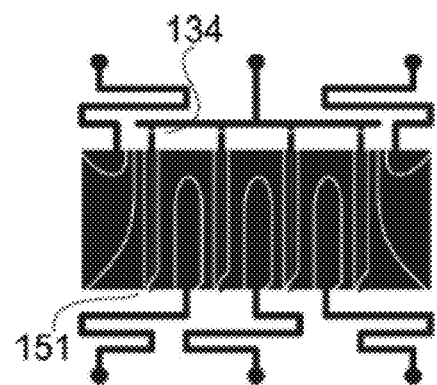
FIG. 22 shows an exemplary embodiment for sequentially laminating liquids in a microfluidic chamber utilizing the fluid triggerable valve embodiment of FIG. 10.
Figure 23:
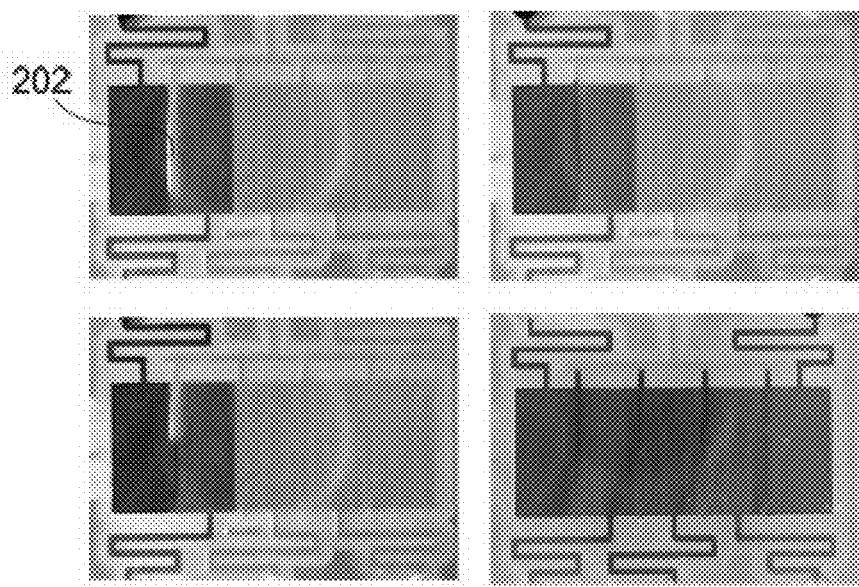
FIG. 23 shows a sequence of experimentally obtained images demonstrating the operation of the structure of FIG. 9.

FIG. 22 shows an embodiment and FIG. 23 its corresponding sequence of experimentally derived images of operation. The embodiment is designed for laminating liquids next to one another using a touch valve geometry similar to that shown in FIG. 10. The experimental results in FIG. 23 show that coloured aqueous liquids are laminated one next to the other largely without distorting the profile of orderly lanes.

For the above experimental images depicted in FIGS. 14, 15, 17, 19, 21 and 23, a Glass-DFR-Glass hybrid construct was used were channels and capillary pressure barriers were patterned in acrylic photopolymer (Ordyl SY330, commercially available from Elga Europe, Italy), on a glass bottom substrate. The top substrate is also glass. The acrylic photopolymer had a contact angle of around 70° with water, while glass has a contact angle of about 20° with water.

With the use of such specific materials, comparatively large stretching distances can be applied due to the high stability of the barriers.

Figure 24:
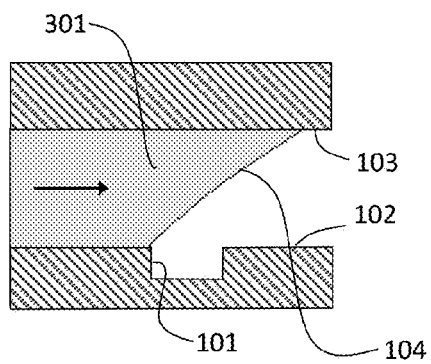
FIG. 24 is a schematic showing a vertical section of a microfluidic channel having a capillary pressure barrier as a recess or groove in accordance with the present invention.

Referring now to the microfluidic channel of FIG. 24, a vertical section of a microfluidic channel includes a capillary pressure barrier 101 patterned as a recess or groove on the bottom substrate 102. A fluid 301 is pinned on the capillary pressure barrier and stretches along the top substrate 103, giving rise to a fluid-fluid meniscus 104.

Figure 25:
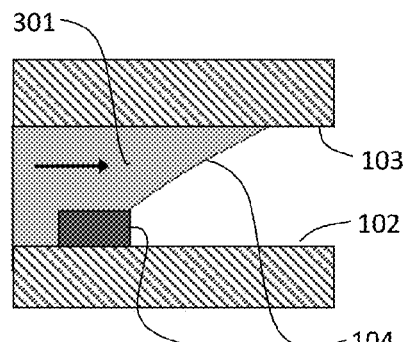
FIG. 25 is a schematic showing a vertical section of a microfluidic channel having a capillary pressure barrier as a protuberance on a bottom surface thereof, in accordance with the present invention.

FIG. 25 shows a vertical section of a different microfluidic channel, in which a capillary pressure barrier 101 is patterned as a protuberance on the bottom substrate 102. A fluid 301 is pinned on the capillary pressure barrier and stretches along the top substrate 103, giving rise to a fluid-fluid meniscus 104.

Figure 26:
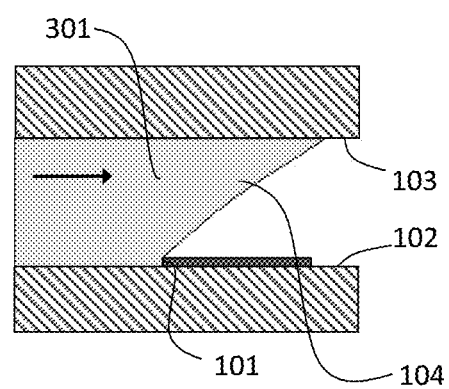
FIG. 26 is a schematic showing a vertical section of a microfluidic channel having a capillary pressure barrier patterned as a line on a bottom substrate in which the line has a different wettability than the material of the bottom substrate in accordance with the present invention.

In FIG. 26, a vertical section of another microfluidic channel, in accordance with the present invention, has a capillary pressure barrier 101 patterned as a line on the bottom substrate 102, the line having a different wettability than the material of the bottom substrate. A fluid 301 is pinned on the capillary pressure barrier and stretches along the top substrate 103, giving rise to a fluid-fluid meniscus 104.

Figure 27:
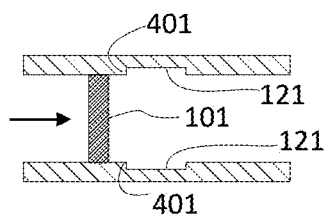
FIG. 27 is a schematic depicting two stretching barriers within stretching distance of a capillary pressure barrier in accordance with the present invention.

Referring now to FIG. 27, in accordance with one additional embodiment, two stretching barriers are provided at a distance less than the maximum stretching distance of the fluid-fluid meniscus upon alignment along the capillary pressure barrier in the absence of the stretching barrier. Shown is a top view of a microfluidic channel having two recesses or grooves 121 that, when patterned within stretching distance, both create a stretching barrier 401 for a fluid-fluid meniscus that is present on the capillary pressure barrier.

Figure 28:
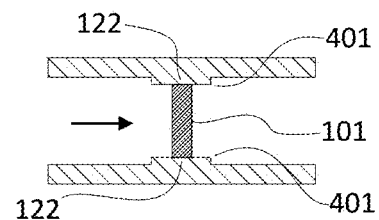
FIG. 28 is a schematic illustrating another aspect of the present invention where two stretching barriers are provided as two protuberances on a wall of a microfluidic channel.

FIG. 28 shows another embodiment in accordance with the present invention in which two stretching barriers are provided as two protuberances 122 on the walls of the microfluidic channel. A particularly useful aspect of the embodiment depicted in FIG. 28 is that the capillary pressure barrier is stable in both possible directions of meniscus advancement.

Figure 29:
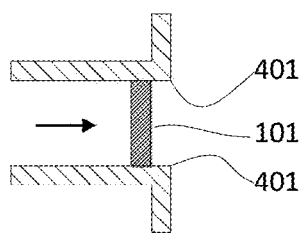
FIG. 29 is a schematic illustrating yet another microfluidic channel in which two stretching barriers are created by a bending of two channel walls in accordance with the present invention.

In yet another embodiment, FIG. 29 shows two stretching barriers 401 created by a bending of two channel walls.

Figure 30:
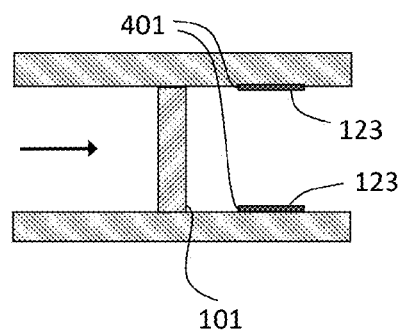
FIG. 30 is a schematic showing yet another microfluidic channel in which two stretching channels in which two stretching barriers are provided as lines on a side of the microfluidic channel in accordance with the present invention.

In yet a further embodiment, FIG. 30 depicts two stretching barriers 401 provided as lines 123 on the side walls of a microfluidic channel. The lines 123 are made of a material that is of lower wettability than the material of the wall adjacent the lines 123.

While this invention has been shown and described in terms of a preferred embodiment, it will be understood that this invention is not limited to any particular embodiment and that changes and modifications may be made without departing from the true spirit and scope of the invention as defined in the appended claims. The above examples illustrate the effectiveness of the subject invention.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Implementation of the techniques, blocks, steps and means described above may be done in various ways.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. The listing or discussion of an apparently prior-published document in this specification should not necessarily be taken as an acknowledgement that the document is part of the state of the art or is common general knowledge.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A fluid triggerable passive valve for controlling flow of one or more fluids comprising:
    a volume comprising at least two capillary pressure barriers for respectively pinning a first and second fluid-fluid meniscus,
    the two capillary pressure barriers dividing the volume in at least three sub volumes, whereby two sub volumes being positioned upstream and one sub volume being positioned downstream with respect to the advancement direction of each respective fluid-fluid meniscus;
    wherein the capillary pressure barriers are spaced apart such that upon pinning of a first fluid-fluid meniscus on a first capillary pressure barrier and arrival or pinning of a second fluid-fluid meniscus on or at a second capillary pressure barrier, the two menisci touch and thereby coalesce into one fluid-fluid meniscus.

2. A valve according to claim 1, where upon coalescence of the two fluid-fluid menisci, the pressure required for breaching the pinned state of the resulting fluid-fluid meniscus is lower than the pressure required for breaching the pinned state of one or more fluid-fluid meniscus before coalescence.

3. A valve according to claim 1, wherein upon coalescence of the two fluid-fluid menisci the pinning of the resulting fluid-fluid meniscus is relieved and the meniscus is permitted to advances in downstream direction.

4. A valve according to claim 1, whereby at least one of each sub-volumes comprises or is a microfluidic channel.

5. A valve according to claim 1, where at least one capillary pressure barrier is stabilized by
    (a) subtending at both ends an angle with a wall of the volume that on the downstream side of the capillary pressure barrier is greater than 90°,
    and/or
    (b) wherein the capillary pressure is stabilized by providing a stretching barrier at a distance less than the maximum stretching distance of the fluid-fluid meniscus upon alignment along the capillary pressure barrier in the absence of the stretching barrier, the stretching barrier being shaped such that at least one directional component is orthogonal to the capillary pressure barrier and/or
    (c) the capillary pressure barrier is stabilized by subtending at one end an angle with a wall of the volume that on the downstream side of the capillary pressure barrier is greater than 90°, and at the other end is stabilized by providing a stretching barrier at a distance less than the maximum stretching distance of the fluid-fluid meniscus upon alignment along the capillary pressure barrier in the absence of the stretching barrier, the stretching barrier being shaped such that at least one directional component is orthogonal to the capillary pressure barrier.

6. A valve according to claim 5, wherein the stretching barrier is defined or includes one or more of:
    iv) a recess or groove defined in the material of a wall of the volume;
    v) a protuberance from a wall of the volume into the volume;
    vi) a bend or recess opening into a further channel or reservoir;
    vii) a line defined in or on the material of a wall of the volume that is of lower wettability than the material of the said wall adjacent the line.

7. A valve according claim 5, wherein the two capillary pressure barriers are stabilized by at least one common stretching barrier.

8. A valve according to claim 7, whereby coalescence of the two menisci results in breaching the at least one common stretching barrier.

9. A valve according to claim 1, wherein the capillary pressure barrier is defined by or includes one or more of:
   i) a recess or groove defined in the material of a wall of the volume;
   ii) a protuberance from a wall of the volume into the volume; and/or
   iii) a line defined in or on the material of a wall of the volume that is of lower wettability than the material of the said wall adjacent the line.

10. A valve according to claim 1, wherein the distance that the two capillary pressure barriers are spaced apart is less than twice the maximum stretching distance of each fluid-fluid meniscus that is pinned on one said capillary pressure barrier in the absence of the second fluid-fluid meniscus.

11. A valve according to claim 10, wherein the maximum stretching distance, $d_s$, is defined by formula I:

$$d_s = g\left(\frac{\cos\theta_2 - \sin\theta_1}{\cos\theta_1 - \sin\theta_2}\right), \quad (I)$$

wherein g represents the distance between the first substrate on which the first capillary pressure barrier is provided and the second substrate facing the substrate on which the first capillary pressure barrier is provided; wherein $\theta_1$ represents the contact angle of the fluid with the material of the substrate facing the first capillary pressure barrier; and wherein $\theta_2$ represents the contact angle of the fluid with the capillary pressure barrier material.

12. A valve according to claim 1, wherein the volume comprises two capillary pressure barriers for holding two fluid-fluid menisci and an intermediate volume defined by the two capillary pressure barriers and the menisci once pinned, wherein the two capillary pressure barriers converge at a minimal distance at least at one point thereby reducing the intermediate volume for allowing the menisci to contact at this point upon pinning of both menisci and/or stretching of at least one meniscus.

13. A valve according to claim 1, further comprising means for applying a pressure on at least one of the fluid streams to stretch one or more of the menisci.

14. A valve according to claim 13, further comprising at least one upstream channel and at least one downstream channel provided in fluid connection to the volume.

15. A microfluidic circuit including at least one microfluidic chamber and at least one fluid triggerable valve according to claim 1.

16. A microfluidic circuit according to claim 15, comprising at least two fluid triggerable valves, wherein the first valve requires a different bursting pressure with respect to the second valve, thereby allowing a selective operation of valves.

17. A microfluidic circuit according to claim 15, whereby the distance between the two capillary pressure barriers contained by the first valve differs from the distance between the two capillary pressure barriers contained by at least a second valve.

18. A microfluidic circuit according to claim 15, whereby the distance between the at least one capillary pressure barrier and at least one stretching barrier contained by the first valve differs from the distance between the at least one capillary pressure barrier and at least one stretching barrier contained by the second said valve.

19. Use of a valve according to claim 1 for the control of microfluidic fluid flows.

20. A process for the controlled release of a microfluidic flow, comprising providing at least a first and a second fluid stream to a fluid triggerable valve or circuit according to claim 1, and increasing the pressure until the first and second fluid stream merge through operation of the valve.

* * * * *